US012528750B2

(12) United States Patent
Wang et al.

(10) Patent No.: US 12,528,750 B2
(45) Date of Patent: Jan. 20, 2026

(54) ALL-SOLID WASTE-BASED CARBONATED UNBURNED LIGHTWEIGHT AGGREGATE AND PREPARATION METHOD THEREOF

(71) Applicant: ZHEJIANG UNIVERSITY, Zhejiang (CN)

(72) Inventors: Tao Wang, Hangzhou (CN); Mengxiang Fang, Hangzhou (CN); Wenkang Wang, Hangzhou (CN); Xiang Gao, Hangzhou (CN); Zhongyang Luo, Hangzhou (CN); Kefa Cen, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 415 days.

(21) Appl. No.: 18/018,855

(22) PCT Filed: Apr. 13, 2022

(86) PCT No.: PCT/CN2022/086640

§ 371 (c)(1),
(2) Date: Jan. 30, 2023

(87) PCT Pub. No.: WO2023/092928

PCT Pub. Date: Jun. 1, 2023

(65) Prior Publication Data

US 2024/0246870 A1 Jul. 25, 2024

(30) Foreign Application Priority Data

Nov. 29, 2021 (CN) ......................... 202111434838.8

(51) Int. Cl.

*C04B 40/02* (2006.01)
*C04B 18/08* (2006.01)
*C04B 18/14* (2006.01)
*C04B 111/40* (2006.01)

(52) U.S. Cl.

CPC .......... *C04B 40/0231* (2013.01); *C04B 18/08* (2013.01); *C04B 18/142* (2013.01); *C04B 18/144* (2013.01); *C04B 40/0259* (2013.01); *C04B 40/0263* (2013.01); *C04B 2111/40* (2013.01)

(58) Field of Classification Search

CPC ... C04B 40/0231; C04B 18/08; C04B 18/142; C04B 18/144; C04B 40/0259; C04B 40/0263; C04B 2111/40; C04B 20/026; C04B 18/027; C04B 30/00; C04B 18/0409; C04B 18/0436; C04B 18/0481; C04B 18/141; C04B 2201/50; Y02W 30/91

See application file for complete search history.

(56) References Cited

U.S. PATENT DOCUMENTS

2018/0179107 A1 6/2018 Gao et al.

FOREIGN PATENT DOCUMENTS

| | | |
|---|---|---|
| CN | 102173747 | 9/2011 |
| CN | 102351557 | 2/2012 |
| CN | 103771780 | 5/2014 |
| CN | 109467443 | 3/2019 |
| CN | 111268979 | 6/2020 |
| CN | 111362607 | 7/2020 |
| CN | 111574146 | 8/2020 |
| CN | 112500011 | 8/2020 |
| CN | 110759680 B * | 2/2021 |
| CN | 113666771 A * | 11/2021 |

* cited by examiner

*Primary Examiner* — Anthony J Green
(74) *Attorney, Agent, or Firm* — Jiwen Chen; Joywin IP Law PLLC

(57) ABSTRACT

The present invention is proposed to disclose a method for preparing an all-solid waste-based carbonated unburned lightweight aggregate. The method includes the following steps: (1) subjecting an active component type solid waste, a lightweight filling type solid waste, and an alkali activation type solid waste to grinding and mixing to obtain a mixed solid waste powder; and (2) subjecting the mixed solid waste powder and water to granulation to obtain particles, and subjecting the particles to precuring and mineralization curing with $CO_2$ to obtain the all-solid waste-based carbonated unburned lightweight aggregate. The active component type solid waste includes blast furnace slag, steel slag, or furnace slag. The lightweight filling type solid waste includes fly ash, river silt, or red mud. The alkali activation type solid waste includes carbide slag. In the present invention, all raw materials are selected from solid wastes, the alkali activation type solid waste is used as an alkali activator to replace traditional quicklime, sodium hydroxide, and sodium silicate, and a $CO_2$ mineralization strengthening technology is used, so that the carbon fixation potential of the solid wastes is fully exerted, natural resources are saved, and the all-solid waste-based carbonated unburned lightweight aggregate prepared has excellent compressive strength.

9 Claims, 2 Drawing Sheets

ALL-SOLID WASTE-BASED CARBONATED UNBURNED LIGHTWEIGHT AGGREGATE AND PREPARATION METHOD THEREOF

This is a U.S. national stage application of PCT Application No. PCT/CN2022/086640 under 35 U.S.C. 371, filed Apr. 13, 2022 in Chinese, claiming priority of Chinese Application No. 202111434838.8, filed Nov. 29, 2021, all of which are hereby incorporated by reference.

FIELD OF TECHNOLOGY

The present invention belongs to the technical field of resource utilization of solid wastes and building materials, and specifically relates to an all-solid waste-based carbonated unburned lightweight aggregate and a preparation method thereof.

BACKGROUND TECHNOLOGY

As China is the country with highest production of steel and consumption of coal in the world, large quantities of industrial solid wastes such as blast furnace slag and fly ash are produced. However, due to a low resource utilization ratio of the industrial solid wastes and the stacking of the industrial solid wastes in large quantities in China, not only are land resources destroyed, but also groundwater is polluted, and air pollution by raise dust is caused. Therefore, it is urgent to consume the solid wastes. A carbon capture, utilization and storage (CCUS) technology is one of effective ways to reduce carbon emissions on a large scale. As a novel technology for utilization of $CO_2$ and curing of building materials, a $CO_2$ mineralization strengthening technology for building material products includes using a $CO_2$ mineralization process to replace a traditional hydration steam curing process, and mineralization with $CO_2$ is conducted to form an inorganic carbonate with high thermal stability by using an alkaline earth metal ion mineral containing calcium and magnesium in nature or industrial production. According to this technology, $CO_2$ emissions are reduced, and meanwhile the production of high-performance building materials and the resource utilization of solid wastes are achieved. The technology is a $CO_2$ emission reduction approach with significant economic benefits.

The solid wastes are subjected to the mineralization curing with carbon dioxide to prepare building materials, so that not only are the solid wastes and carbon dioxide consumed, but also traditional curing methods of building materials such as high-temperature sintering and high-temperature steam curing are replaced. The energy consumption is further reduced, and the carbon dioxide emissions are reduced. Furthermore, the curing cycle is shortened, the production efficiency is improved, and the building materials with high added value are obtained.

According to a Chinese patent document with a publication number of CN102173747A, a method for preparing ceramsite by sintering urban sludge, loess and bentonite is disclosed. The ceramsite is obtained by directly sintering the original sludge, the loess, and the bentonite with bran as fuel. The sludge is disposed in large quantities, and the production cost is low. According to a Chinese patent document with a publication number of CN109467443A, a method for preparing recycled ceramsite by sintering sludge and shale powder as main raw materials is disclosed. According to the above methods, natural resources are still included in ingredients. Meanwhile, a sintering process is used, so that the pollution and the greenhouse effect are increased.

According to a Chinese patent document with a publication number of CN102351557B, a method for producing unburned ceramsite by using activated sludge and fly ash is disclosed. Full-solid wastes are used, but natural curing is used, and low performance is achieved. According to a Chinese patent document with a publication number of CN112500011A, a method for producing a lightweight aggregate from steel slag, a vitrified microbead and quicklime by using a carbonization process is disclosed. The performance of a finished product is great, but the cost is high. According to a Chinese patent document with a publication number of CN111362607A, a lightweight solid waste unburned ceramsite is disclosed. A steel slag powder, a slag powder, Portland cement, an activator, a density modifier, and water are used as raw materials. According to the disclosure, a hollow glass microbead is used as the density modifier, so that the bulk density of a ceramsite product is decreased, and the strength is improved. The method has high production cost.

SUMMARY OF INVENTION

The present invention is proposed to provide a method for preparing an all-solid waste-based carbonated unburned lightweight aggregate. All raw materials are selected from solid wastes, an alkali activation type solid waste is used to replace a traditional alkali activator, and a $CO_2$ mineralization strengthening technology is used, so that the carbon fixation potential of the solid wastes is fully exerted, natural resources are saved, and the problem of utilization of small quantities of solid wastes with low value is solved. The all-solid waste-based carbonated unburned lightweight aggregate prepared has excellent compressive strength.

Specific technical solutions used are as follows.

A method for preparing an all-solid waste-based carbonated unburned lightweight aggregate includes the following steps:

(1) subjecting an active component type solid waste, a lightweight filling type solid waste, and an alkali activation type solid waste to grinding and mixing to obtain a mixed solid waste powder; and (2) subjecting the mixed solid waste powder and water to granulation to obtain a particle, and subjecting the particle to precuring and mineralization curing with $CO_2$ to obtain the all-solid waste-based carbonated unburned lightweight aggregate.

The active component type solid waste includes blast furnace slag, steel slag, or furnace slag; the lightweight filling type solid waste includes fly ash, river silt, or red mud, and has a bulk density of less than 1,000 $kg/m^3$; and the alkali activation type solid waste includes carbide slag.

In the present invention, the active component type solid waste includes calcium silicate, magnesium silicate, calcium aluminate, and other hydration active substances. The lightweight filling type solid waste includes an alkaline oxide. The alkali activation type solid waste is used as an alkali activator to replace traditional quicklime, sodium hydroxide, and sodium silicate. In the precuring stage, the hydration active substances initially react with water to achieve initial strength. In the process of mineralization curing with $CO_2$, $CO_2$ reacts with an alkaline component to obtain a reaction product, which can be filled into pores, so that the strength and durability of the product are improved.

Preferably, after the mineralization curing with $CO_2$, the particle is subjected to natural curing under the condition of water supplement to obtain the all-solid waste-based carbonated unburned lightweight aggregate. The particle is subjected to the mineralization curing with $CO_2$ to obtain a carbonated particle, and the carbonated particle is subjected to the natural curing under the condition of water supplement, so that the active components are fully hydrated, and the compressive strength of the obtained all-solid waste-based carbonated unburned lightweight aggregate is further improved.

Further preferably, the natural curing is conducted by natural stacking. Due to the natural stacking, a hydration reaction can be conducted more thoroughly.

Preferably, the active component type solid waste is the blast furnace slag or the steel slag, the lightweight filling type solid waste is the fly ash, and the alkali activation type solid waste is the carbide slag.

In the grinding process, the solid wastes may be physically activated. Preferably, the mixed solid waste powder has a particle size of less than 100 μm.

Preferably, in the mixed solid waste powder, a weight ratio of the active component type solid waste to the lightweight filling type solid waste to the alkali activation type solid waste is (1-9):1:(0.02-1).

Preferably, in step (2), the granulation process comprises the following steps:

(1) taking the mixed solid waste powder and the water at a mass ratio of 1:(0.2-0.3), dividing the mixed solid waste powder into a first part and a second part at a mass ratio of equal to or greater than 2, and subjecting the first part of the mixed solid waste powder and the water to granulation; and (2) taking another spare water as a spray supplement to the granulation until a slurry mixture is formed by the first part of the mixed solid waste powder and the water, and then adding the second part of the mixed solid waste powder to obtain a spherical particle.

Further preferably, the granulation is conducted by using a spheroidization disc at a rotation speed of 20-60 r/min, and spheroidization is conducted for 45-60 min.

Preferably, in step (2), the precuring is conducted under ambient pressure at a humidity of 70%-90% RH and a temperature of 15-25° C. for 24-72 hours.

Preferably, in step (2), a water-solid ratio of the particle after the precuring is controlled at 0.15-0.25. As a pore structure of the aggregate is affected by the water-solid ratio of the particle after the precuring, the diffusion of $CO_2$ in the aggregate is further affected, so that the speed and depth of a carbonation reaction are affected, and finally, the performance of a product is affected.

Preferably, in step (2), the mineralization curing with $CO_2$ is conducted under a $CO_2$ pressure of 0.1-1 MPa at a temperature of 40-140° C. for 2-4 hours.

The present invention is further proposed to provide an all-solid waste-based carbonated unburned lightweight aggregate prepared by the method for preparing an all-solid waste-based carbonated unburned lightweight aggregate.

Compared with the prior art, the present invention has the following beneficial effects.

(1) The mineralization curing with $CO_2$ is used in the method of the present invention. Compared with a sintering method, the energy consumption is reduced, and $CO_2$ and pollutant emissions are reduced. Compared with a natural curing method, the strength and durability are improved, and $CO_2$ can also be consumed.

(2) According to the all-solid waste-based carbonated unburned lightweight aggregate prepared in the present invention, all raw materials are selected from solid wastes, and the alkali activation type solid waste is used as an alkali activator to replace traditional quicklime, sodium hydroxide, and sodium silicate, so that the carbon fixation potential of the solid wastes is fully exerted, natural resources are saved, the cost is greatly reduced, and the problem of utilization of small quantities of solid wastes with low value is solved.

DESCRIPTION OF THE EMBODIMENTS

The present invention is further described with reference to accompanying drawings and embodiments. It should be understood that the embodiments are merely intended to illustrate the present invention, rather than to limit the scope of the present invention.

Figure 1:
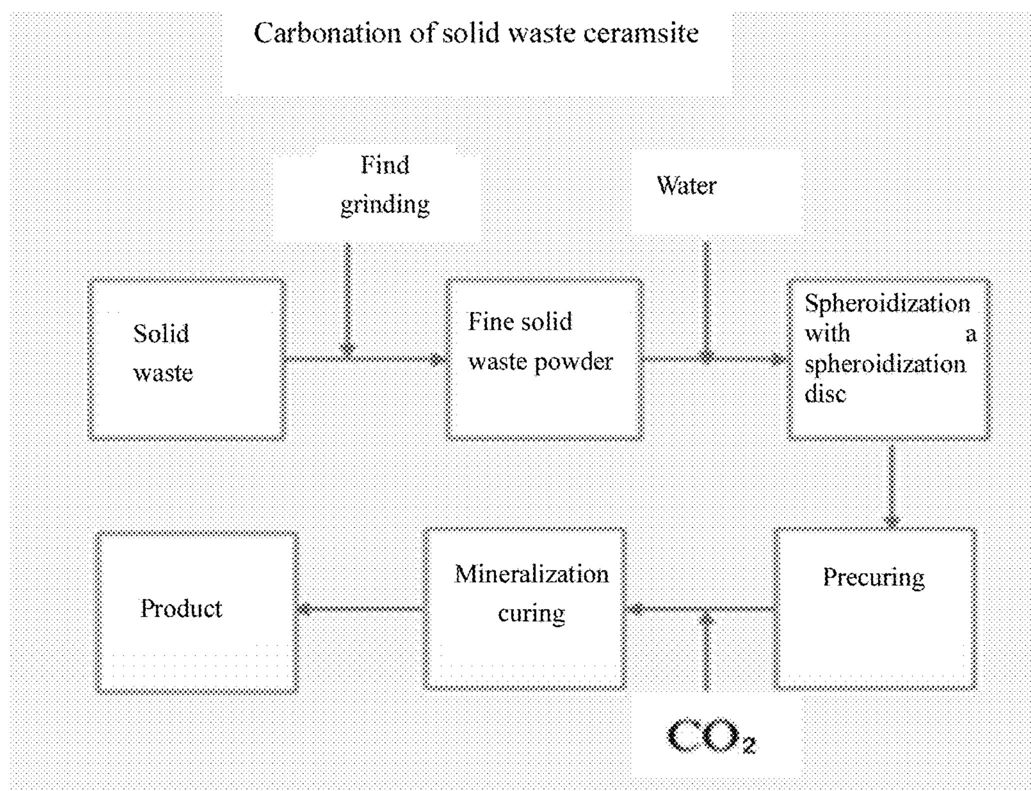
FIG. 1 is a diagram showing a preparation flow of an all-solid waste-based carbonated unburned lightweight aggregate in the present invention.

FIG. 1 is a diagram showing a preparation flow of all-solid waste-based carbonated unburned lightweight aggregates in Examples 1 to 3. In Examples 1 to 3 and Comparative Examples 1 to 6, blast furnace slag was purchased from Shijiazhuang Lingshou Yanhang Mineral Products Trading Co., Ltd.

Fly ash was purchased from Hangzhou Hanglian Thermal Power Co., Ltd.

Carbide slag was purchased from Shijiazhuang Lingshou Yanhang Mineral Products Trading Co., Ltd.

Comparative Example 1

In this comparative example, blast furnace slag was selected as an active component type solid waste, and fly ash was selected as a lightweight filling type solid waste.

The blast furnace slag and the fly ash were separately ground, and then mixed in proportion to obtain a mixed powder with a particle size of less than 100 μm. In the mixed powder, a weight ratio of the blast furnace slag to the fly ash was 1.5:1.

The mixed powder and water were taken at a mass ratio of 1:0.2, the mixed powder was divided into a first part and a second part at a mass ratio of 2:1, and the first part of the mixed powder and the water were thoroughly mixed, and then subjected to granulation in a spheroidization disc at a rotation speed of 30 r/min, where spheroidization was conducted for 30 min. Another spare water was taken as a spray supplement to the granulation until a slurry mixture was formed by the first part of the mixed powder and the water, and then the second part of the mixed powder was added to obtain spherical particles.

The spherical particles were put into a precuring box for precuring under ambient pressure at a humidity of 70% RH and a temperature of 25° C. for 72 hours, where the internal moisture content was controlled at about ⅔ of an initial water volume. Then, the spherical particle was put into a special $CO_2$ mineralization curing device, into which 99.9% of a $CO_2$ gas was introduced to make the internal gas pressure maintained at 0.1 MPa. Accelerated carbonation was conducted at a temperature of 40° C. for 4 hours to obtain an unburned lightweight aggregate.

Figure 3:
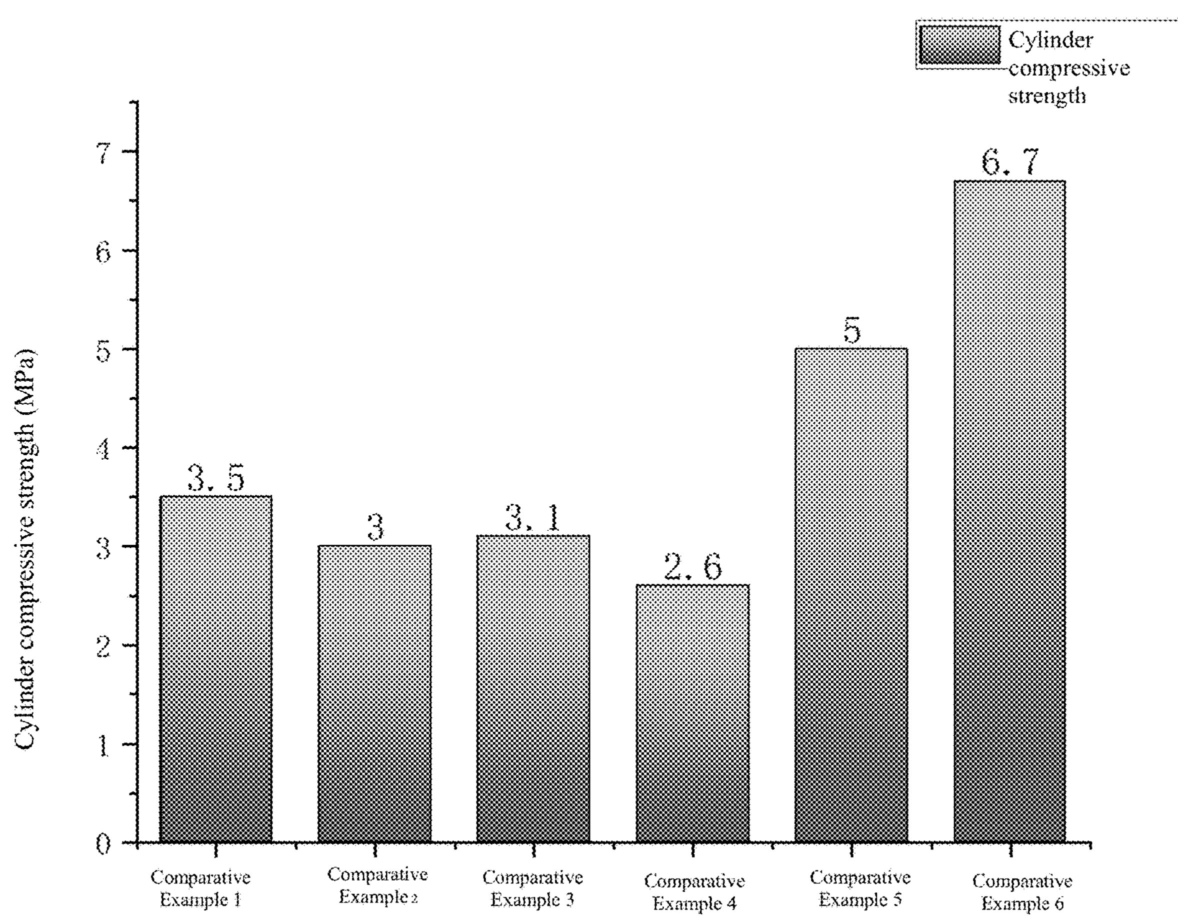
FIG. 3 is a statistical diagram showing the cylinder compressive strength of unburned lightweight aggregates prepared in Comparative Examples 1 to 6.

As shown in FIG. 3, the unburned lightweight aggregate prepared in the comparative example has a cylinder compressive strength of 3.5 MPa.

Comparative Example 2

In this comparative example, a method for preparing an unburned lightweight aggregate was the same as that in Comparative Example 1. The difference was that in a mixed powder, a weight ratio of blast furnace slag to fly ash was 4:1.

As shown in FIG. 3, the unburned lightweight aggregate prepared in the comparative example has a cylinder compressive strength of 3 MPa.

Example 1

In this example, blast furnace slag was selected as an active component type solid waste, fly ash was selected as a lightweight filling type solid waste, and carbide slag was selected as an alkali activation type solid waste.

The blast furnace slag, the fly ash, and the carbide slag were separately ground, and then mixed in proportion to obtain a mixed solid waste powder with a particle size of less than 100 μm. In the mixed solid waste powder, a weight ratio of the blast furnace slag to the fly ash to the carbide slag was 1.5:1:0.075.

The mixed solid waste powder and water were taken at a mass ratio of 1:0.2, the mixed solid waste powder was divided into a first part and a second part at a mass ratio of 2:1, and the first part of the mixed solid waste powder and the water were thoroughly mixed, and then subjected to granulation in a spheroidization disc at a rotation speed of 30 r/min, where spheroidization was conducted for 30 min. Another spare water was taken as a spray supplement to the granulation until a slurry mixture was formed by the first part of the mixed solid waste powder and the water, and then the second part of the mixed solid waste powder was added to obtain a spherical particle.

The spherical particles were put into a precuring box for precuring under ambient pressure at a humidity of 70% RH and a temperature of 25° C. for 72 hours, where the internal moisture content was controlled at about ⅔ of an initial water volume (that is to say, a water-solid ratio of the particle after the precuring was about 0.15-0.25). Then, the spherical particle was put into a special $CO_2$ mineralization curing device, into which 99.9% of a $CO_2$ gas was introduced to make the internal gas pressure maintained at 0.1 MPa. Accelerated carbonation was conducted at a temperature of 40° C. for 4 h to obtain an all-solid waste-based carbonated unburned lightweight aggregate.

Figure 2:
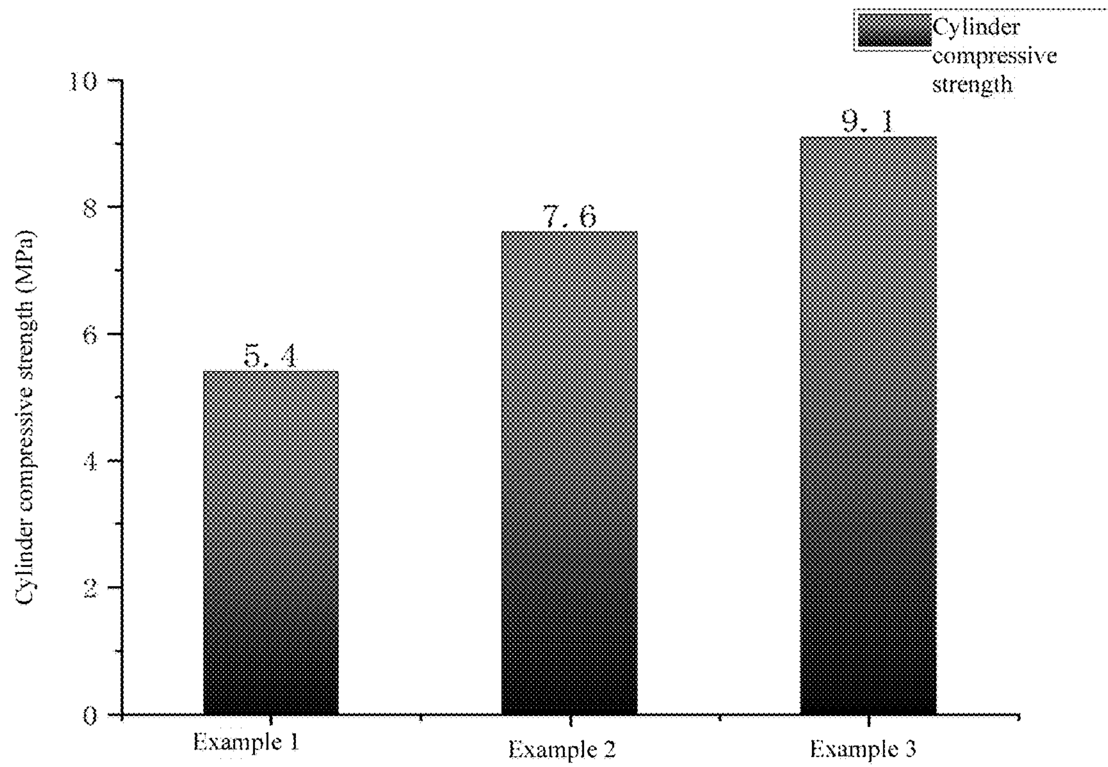
FIG. 2 is a statistical diagram showing the cylinder compressive strength of all-solid waste-based carbonated unburned lightweight aggregates prepared in Examples 1 to 3.

As shown in FIG. 2, the all-solid waste-based carbonated unburned lightweight aggregate prepared in the example has a cylinder compressive strength of 5.4 MPa. It can be seen that the strength of the unburned lightweight aggregate can be greatly improved by adding the alkali activation type solid waste as a raw material.

Example 2

In this example, a method for preparing an all-solid waste-based carbonated unburned lightweight aggregate was the same as that in Example 1. The difference was that in a mixed powder, a weight ratio of blast furnace slag to fly ash to carbide slag was 1.5:1:0.125.

As shown in FIG. 2, the all-solid waste-based carbonated unburned lightweight aggregate prepared in the example has a cylinder compressive strength of 7.6 MPa.

Example 3

In this example, a method for preparing an all-solid waste-based carbonated unburned lightweight aggregate was the same as that in Example 1. The difference was that after mineralization curing, natural curing was conducted under the condition of water supplement for 4 days to obtain the all-solid waste-based carbonated unburned lightweight aggregate.

As shown in FIG. 2, the all-solid waste-based carbonated unburned lightweight aggregate prepared in the example has a cylinder compressive strength of 9.1 MPa.

Comparative Examples 3 to 6

In Comparative Examples 3 to 6, methods for preparing unburned lightweight aggregates were the same as those in Comparative Examples 1 to 2 and Examples 1 to 2, respectively. The difference was that the steps of precuring and mineralization curing with $CO_2$ of the spherical particle were changed into natural curing under the condition of water supplement.

As shown in FIG. 3, the unburned lightweight aggregates prepared in Comparative Examples 3 to 6 have a cylinder compressive strength of 3.1 MPa, 2.6 MPa, 5 MPa, and 6.7 MPa, respectively. It can be seen that the unburned lightweight aggregate prepared by using $CO_2$ mineralization strengthening technology has better strength.

Sample Analysis

After tests, it is found that the all-solid waste-based carbonated unburned lightweight aggregates prepared in Examples 1 to 3 satisfy Lightweight Aggregates and Its Test Methods GB/T 17431.1-2010.

Through comparison between Comparative Examples 1 to 2 and Examples 1 to 2, it can be seen that the cylinder compressive strength of an unburned lightweight aggregate can be improved by about 20%-200% by adding a solid waste alkali activator at different ratios.

Through comparison between Comparative Examples 3 to 6, Comparative Examples 1 to 2, and Examples 1 to 2, it can be seen that compared with natural curing, the cylinder compressive strength of an unburned lightweight aggregate obtained by mineralization curing can be improved by about 5%-30%.

Through comparison between Examples 1 to 2 and Example 3, it can be seen that the cylinder compressive strength of an unburned lightweight aggregate obtained by mineralization curing in combination with natural curing can be improved by about 20%-70%.

The technical solutions of the present invention are illustrated in detail with reference to the embodiments described above. It should be understood that the foregoing descriptions are merely included for the purpose of illustrating the specific embodiments of the present invention and should not be considered as a limitation of the present invention. Any modification, supplement, or substitute in a similar manner made within the principle scope of the present invention shall fall within the protection scope of the present invention.

What is claimed is:

1. A method for preparing an all-solid waste-based carbonated unburned lightweight aggregate, comprising the following steps:

(1) subjecting an active component type solid waste, a lightweight filling type solid waste, and an alkali activation type solid waste to grinding and mixing to obtain a mixed solid waste powder; and (2) subjecting the mixed solid waste powder and water to granulation to obtain particles, and subjecting the particles to precuring and mineralization curing with CO2 to obtain the all-solid waste-based carbonated unburned lightweight aggregate;

wherein the active component type solid waste comprises blast furnace slag, steel slag, or furnace slag; the lightweight filling type solid waste comprises fly ash, river silt, or red mud; and the alkali activation type solid waste comprises carbide slag.

2. The method for preparing an all-solid waste-based carbonated unburned lightweight aggregate according to claim 1, wherein after the mineralization curing with CO2, the particles are subjected to natural curing under the condition of water supplement to obtain the all-solid waste-based carbonated unburned lightweight aggregate.

3. The method for preparing an all-solid waste-based carbonated unburned lightweight aggregate according to claim 1, wherein the active component type solid waste is the blast furnace slag or the steel slag, the lightweight filling type solid waste is the fly ash, and the alkali activation type solid waste is the carbide slag.

4. The method for preparing an all-solid waste-based carbonated unburned lightweight aggregate according to claim 1, wherein the mixed solid waste powder has a particle size of less than 100 μm.

5. The method for preparing an all-solid waste-based carbonated unburned lightweight aggregate according to claim 1, wherein in the mixed solid waste powder, a weight ratio of the active component type solid waste to the lightweight filling type solid waste to the alkali activation type solid waste is (1-9):1:(0.02-1).

6. The method for preparing an all-solid waste-based carbonated unburned lightweight aggregate according to claim 1, wherein in step (2), the granulation process comprises the following steps:

(1) taking the mixed solid waste powder and the water at a mass ratio of 1:(0.2-0.3), dividing the mixed solid waste powder into a first part and a second part at a mass ratio of equal to or greater than 2, and subjecting the first part of the mixed solid waste powder and the water to granulation; and (2) adding the water as a spray supplement to the granulation until a slurry mixture is formed by the first part of the mixed solid waste powder and the water, and then adding the second part of the mixed solid waste powder to obtain spherical particles.

7. The method for preparing an all-solid waste-based carbonated unburned lightweight aggregate according to claim 1, wherein in step (2), the precuring is conducted under ambient pressure at a humidity of 70%-90% RH and a temperature of 15-25° C. for 24-72 hours.

8. The method for preparing an all-solid waste-based carbonated unburned lightweight aggregate according to claim 1, wherein in step (2), a water-solid ratio of the particles after the precuring is controlled at 0.15-0.25.

9. The method for preparing an all-solid waste-based carbonated unburned lightweight aggregate according to claim 1, wherein in step (2), the mineralization curing with CO2 is conducted under a CO2 pressure of 0.1-1 MPa at a temperature of 40-140° C. for 2-4 hours.

* * * * *